(12) United States Patent
Rogers, Jr. et al.

(10) Patent No.: US 6,298,604 B1
(45) Date of Patent: Oct. 9, 2001

(54) TORQUE TUBE LIFTGATE

(75) Inventors: Lloyd Walker Rogers, Jr., Shelby Township; John R. Rice, Clinton Township, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/640,339

(22) Filed: Aug. 16, 2000

Related U.S. Application Data

(60) Provisional application No. 60/196,356, filed on Apr. 12, 2000.

(51) Int. Cl.$^7$ ............... E05F 11/00; B62D 25/10
(52) U.S. Cl. ............... 49/340; 49/346; 296/76; 296/106; 296/146.8
(58) Field of Search ............. 49/339, 340, 386, 49/346; 296/106, 146.8, 76, 56; 16/289, 308, 357, 360, 361

(56) References Cited

U.S. PATENT DOCUMENTS

| | | | |
|---|---|---|---|
| 2,810,153 | * 10/1957 | Semar | 16/308 |
| 2,999,683 | * 9/1961 | Pickles | 49/139 |
| 3,091,819 | * 6/1963 | Wheeler et al. | 49/386 |
| 3,583,014 | * 6/1971 | Brown et al. | 14/71.3 |
| 4,223,483 | * 9/1980 | Stafford | 49/386 |
| 4,291,501 | * 9/1981 | Steinberg et al. | 49/386 |
| 5,358,301 | * 10/1994 | Konchan et al. | 296/146.1 |
| 5,448,856 | * 9/1995 | Moore et al. | 49/340 |
| 5,730,239 | * 3/1998 | Holter | 180/69.21 |
| 5,787,549 | * 8/1998 | Soderlund | 16/308 |
| 5,960,519 | * 10/1999 | Thompson et al. | 16/308 |
| 5,988,724 | * 11/1999 | Wolda | 296/57.1 |
| 6,018,912 | * 2/2000 | Baughman et al. | 49/386 |
| 6,070,929 | * 6/2000 | Barkley | 296/76 |

FOREIGN PATENT DOCUMENTS

| | | | | |
|---|---|---|---|---|
| 1403032 | * | 5/1965 | (FR) | 296/56 |
| 896520 | * | 5/1962 | (GB) | 296/76 |

* cited by examiner

*Primary Examiner*—Gregory J. Strimbu
(74) *Attorney, Agent, or Firm*—Patrick M. Griffin

(57) ABSTRACT

A mechanism for lifting and lowering a wide rear liftgate comprising a single power actuator located near only a first side of the liftgate and a torque tube having first and second arms and a central resilient stem. The torque tube is attached to the liftgate with the stem journaled to the liftgate, the first arm adjacent the first side of the liftgate and the second arm attached to a second side of the liftgate. The first arm is attached to the power actuator through a ball stud which extends through a slot in the liftgate. When lifting or lowering the liftgate, the power actuator applies a lifting or lowering force to the first arm twisting the stem and applying the lifting or lowering force to the second side of the liftgate through the second arm. The ball stud then engages the slot applying the lifting or lowering force to the first side of the liftgate.

5 Claims, 3 Drawing Sheets

TORQUE TUBE LIFTGATE

RELATED APPLICATIONS

The present application claims priority from provisional U.S. patent application Ser. No. 60/196,356 filed Apr. 12, 2000.

TECHNICAL FIELD

This invention relates to vehicle power liftgates in general, and specifically to a liftgate in which a power mechanism on only one side can apply torque to both sides of the gate.

BACKGROUND OF THE INVENTION

A recent trend in automotive vehicles has been the provision of power devices to open and close doors, liftgates, hoods, trunks and any other swinging, heavy closure panel. Each type of closure panel presents unique challenges. The rear liftgates on mini vans or SUVs are large, heavy, generally rectangular structures, typically latched at the bottom and hinged across the top to swing up and down. Gas springs generally support the liftgate on both sides at its up, open position, and assist in lifting it. The hold open force of the springs has to be manually overcome during closing, of course. Latches are located at the bottom center of the liftgate, so the manual opening and closing force is centered and evenly distributed. Any powered opening and closing device, however, will generally have to be located at the side of the liftgate opening, so as to be concealed or at least out of the way. As gates lift become larger and are made from lighter, thinner and more flexible materials, they become more subject to twisting with unbalanced forces. This means that unless two power devices are provided, one on each side of the liftgate, it could flex unevenly as it was opened or closed. Obviously, a power opener using a single actuator acting on a single side of the liftgate would be far less expensive, but it is not obvious how it could possibly provide a lifting force to both sides of the panel.

SUMMARY OF THE INVENTION

The invention provides a power opening and closing device for a rear liftgate or the like which does use a single actuator actuator on only one side, but which is able to apply lifting force evenly to both sides of the liftgate.

In the embodiment disclosed, a vehicle having a large area liftgate is pivoted to a vehicle body to swing open and closed about a main axis. As is typical, the liftgagte is formed as a double walled, hollow structure of two interconnected metal sheets or walls. A powered actuator moves up and down in a track that runs generally along one side of the rear liftgate opening of the vehicle. The inner end of a lift rod rides up and down in the track, with sufficient force and distance to raise and lower the liftgate, while the outer end comprises a ball joint. Conventionally, the outer end of the lift rod would be directly attached to the liftgate, and would apply opening and closing force or torque to only one side. Therefore, two would be needed for an even lifting action on each side.

In the disclosed invention, the single actuator acts on the near side of the liftgate directly, and on the far side, indirectly, through an interposed toque tube. The torque tube is generally U shaped, with first and second integral arms bent out generally, generally, but not absolutely, perpendicular to a central, generally straight stem. In a non stressed, free state, the two arms are generally co planar, but the stem is capable of resiliently twisting as the two arms are turn relative to one another out of their co planar free state. The torque tube is located inside the hollow structure of the liftgate, with the stem running along the top edge of the liftgate and the two arms running along the sides thereof. The end of the second arm is fixed to the far side of the liftgate, but the stem is free to turn within a pair of journals that orient the stem along a second axis parallel to the main axis. A ball joint attaches the end of the first arm of the torque tube to the outer end of the lift rod. The torque tube first arm is not fixed to the near side of the liftgate, but is free to turn back and forth, out of its free state, relative to the fixed arm. The degree of relative turning between the fixed and free torque tube arms is determined by a slot or other structure on the liftgate that acts as a stop to constrain the end of the non fixed arm in each direction.

In operation, as the actuator begins to move up, the lift rod pushes up on the torque tube free arm, twisting the stem resiliently and transferring torque to the fixed arm. A lifting force or torque is thereby applied indirectly to the far side of the liftgate. The torque tube continues to twist until the end of the free arm hits the outer end of the slot, at which point the first arm begins to directly lift the near side of the liftgate. Lifting force is thereafter applied to both sides of the liftgate until it reaches the fully open position and the actuator stops. At the fully open position, gas springs or some other hold open device provides a counterbalancing, hold open force. When the actuator reverses to close the liftgate, the twisting action of the torque tube reverses, applying a closing force to both sides of the liftgate, overcoming the counterbalancing force and pulling the liftgate closed.

BRIEF DESCRIPTION OF THE DRAWINGS

These and other objects and features of the invention will appear from the following written description, and from the drawings, in which.

DESCRIPTION OF THE PREFERRED EMBODIMENT

Figure 1:
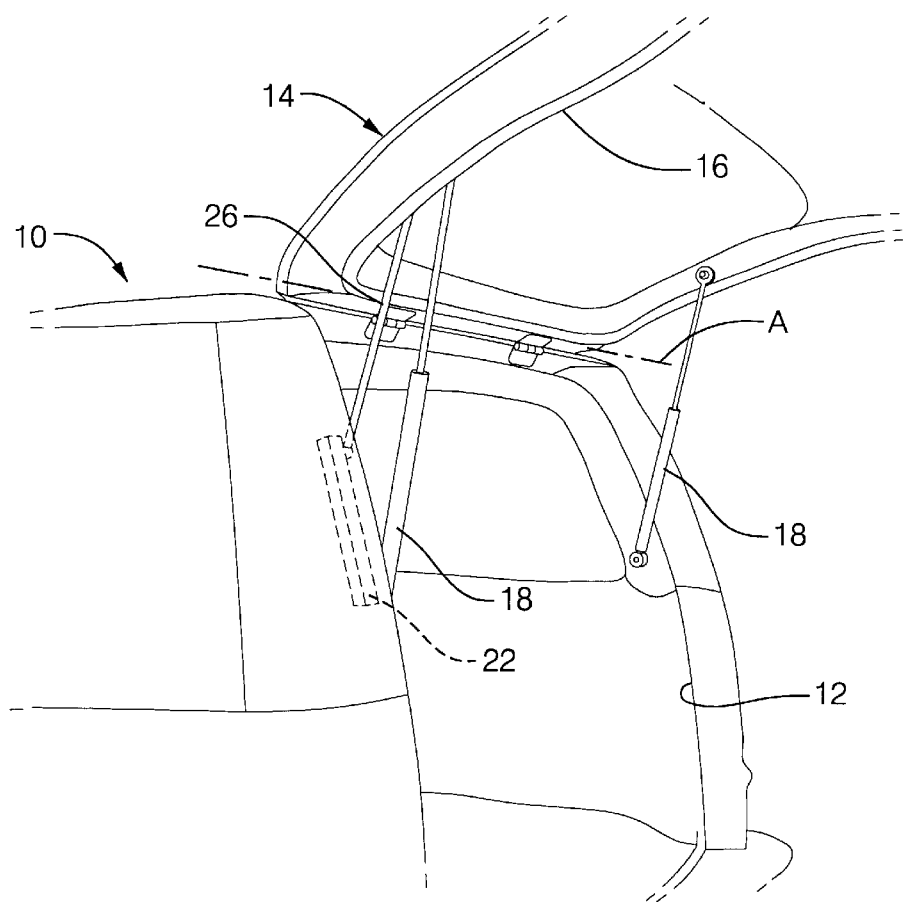
FIG. 1 is a perspective view of a vehicle body and liftgate swung up and fully open.
Figure 4:
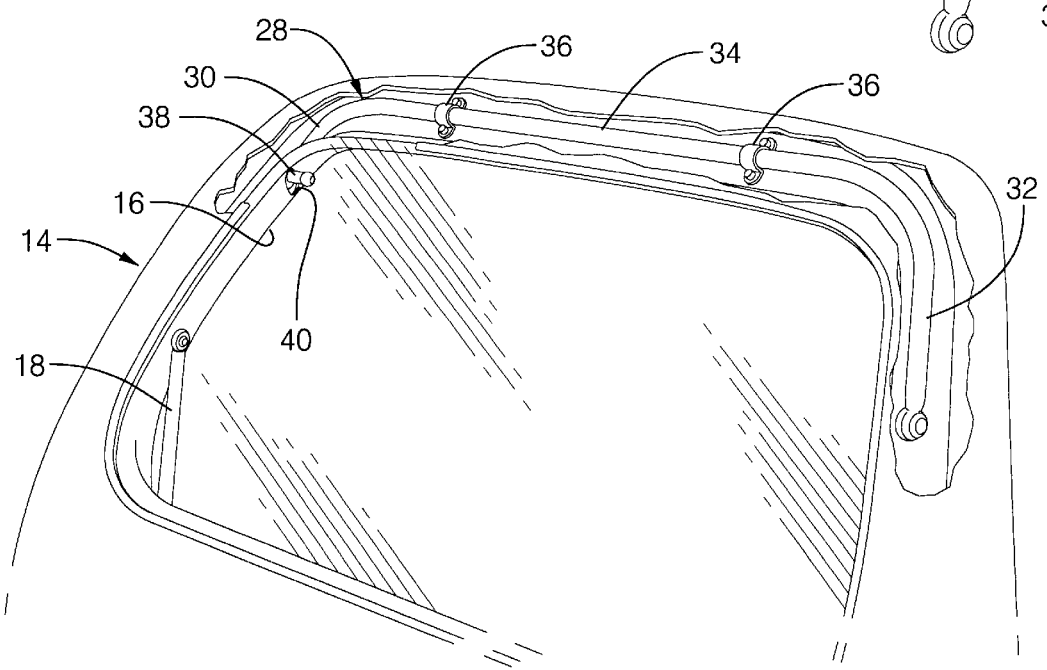
FIG. 4 is a perspective view of the top portion of the liftgate partially broken away to show the torque tube inside.

Referring first to FIGS. 1 and 4, the body of a vehicle such as a van or SUV 10 has a rear opening 12 closed by a liftgate, indicated generally at 14. Liftgate 14 is a conventional, double walled hollow structure, with a hollow beam surrounding the edges of a window frame 16. The top of liftgate 14 is pivoted freely to the vehicle to swing open and closed about an upper, main pivot axis A. In the open position, liftgate 14 would be supported by a counterbalancing mechanism, such a pair of gas springs 18. A gas spring 18 is located on each side, because the liftgate 14 is sufficiently wide, heavy and flexible to require a hold open force on both sides, without sagging. The same applies to a potential opening and closing force.

Figure 2:
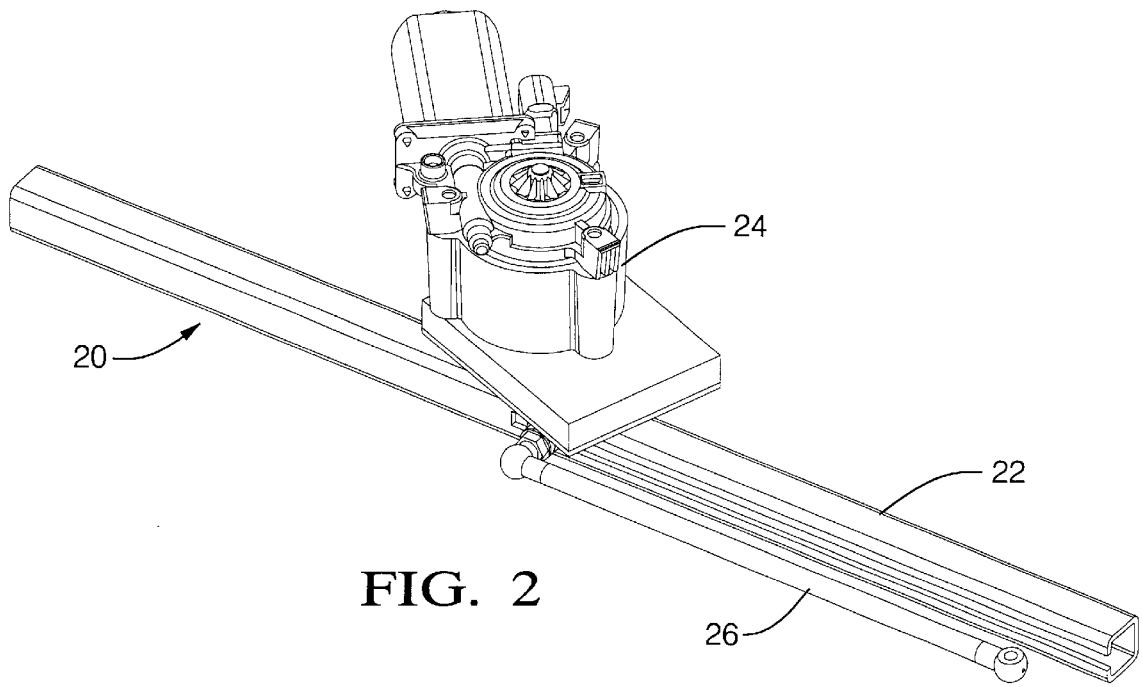
FIG. 2 is a perspective view of a power actuator and lift rod.

Referring next to FIGS. 1 and 2, a single power actuator 20 is used to open and close liftgate 14. Actuator 20 comprises a solid channel track 22 that runs along one side only of opening 12, and a motor 24 that powers a non illustrated rack up and down in channel track 22. The lower end of a link in the form of a lift rod 26 is pivotally attached to the rack within channel track 22, while the upper end is fixed to structure described below. The single actuator 20 has enough travel and force to raise and lower liftgate 14, even acting on only one side, but is unable, without more, to act on both sides to open and close liftgate 14 evenly.

Figure 3:
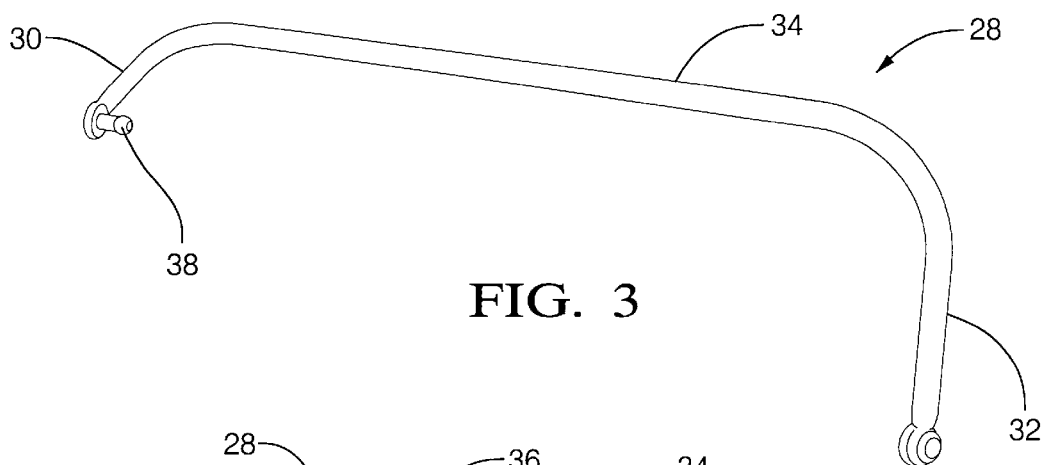
FIG. 3 is a perspective view the torque tube alone.

Referring next to FIG. 3, the mechanism that allows the single actuator 20 to act on both sides of liftgate 14 is a torque tube, indicated generally at 28, attached to liftgate 14 in a particular way. Torque tube 28 is a hollow steel tube, generally cylindrical in cross section, but flattened at each end. Tube 28 is bent into a general U shape with a first, shorter arm 30 and a second, longer arm 32, each integral to a stem 34. The relative length of the two arms 30 an is determined by factors described in more detail below. The shape of the entire tube 28 is designed to generally match the perimeter of the generally rectangular liftgate window frame 16, so that the two arms 30 and 32 are substantially perpendicular to stem 34, but not necessarily perfectly parallel. In a free, unstressed state, the two arms 30 and 32 are substantially coplanar. The material of tube 28 is sufficiently resilient the two arms 30 and 32 can turn relative to one another out of their co planar free state, twisting stem 34 slightly and resiliently therein in the manner of a torsional spring. By "resiliently" it is meant that if the relative turning of the arms 30 and 32 is limited sufficiently, then the elastic limit of stem 34 is not exceeded, so that it stores potential energy as it is "wound up" and can transfer that energy consistently and repeatedly.

Figure 5:
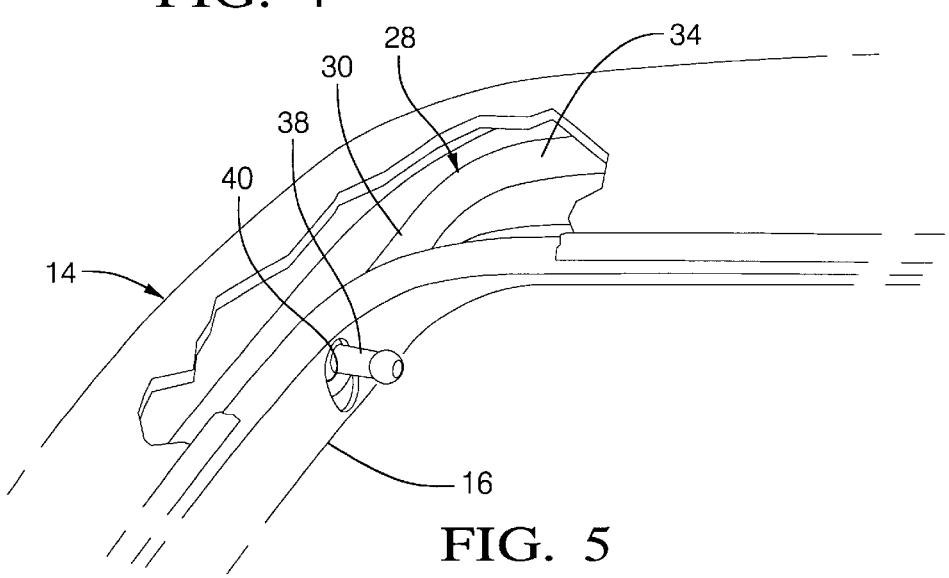
FIG. 5 is a view like FIG. 4 showing more detail of the free end of the torque tube's first arm.

Referring next to FIGS. 4 and 5, torque tube 28 is attached to liftgate 14 internally, that is, within the hollow beam that comprises the window frame 16. It is therefore essentially invisible, but is still able to function. The stem 34 extends along the top edge of, and the two arms 30 and 32 extend down generally along the two sides of, liftgate 14. However, tube 28 is not fixed to the liftgate 14 as a mere reinforcement or brace. In fact, only the lower end of the longer arm 32 is rigidly fixed to the far side of liftgate 14. The stem 34 is surrounded by a pair of journals 36, which establish a fixed turning axis for stem 34 that is parallel the main pivot axis A. Stem 34, therefore, is held to liftgate 14, but is still free to turn or twist slightly within the journals 36. The end of the first arm 30 is not fixed to the near side of liftgate 14, but free to turn back and forth, limited only by a ball stud 38 that extends therefrom through a short arcuate slot 40. As the first arm 30 turns back and forth in either direction relative to the fixed second arm 32, stem 34 twists within the journals 36 in either direction, until the ball stud 38 engages one end or the other opposed end of slot 40, which act as stop members on liftgate 14. This particular attachment of tube 28 to liftgate 14 allows it to operate as described next.

Figure 6:
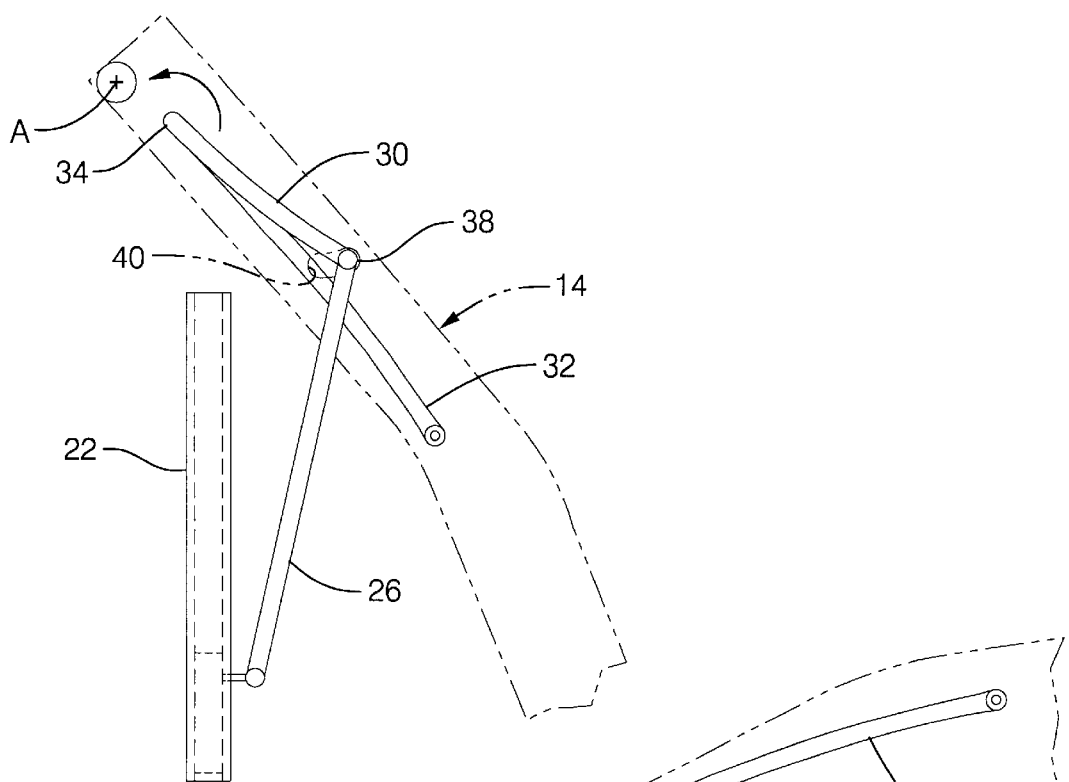
FIG. 6 is a schematic view of the liftgate in the process of being opened.

Referring next to FIGS. 1, 2 and 6, to raise liftgate 14, motor 24 pushes lift rod 26 up within channel track 22, which pushes up on ball stud 38, turning first arm 30 out of its free state and twisting the tube stem 34 slightly within the journals 36. The twist or torsion within stem 34 creates a moment in the direction indicated by the arrow in FIG. 6, which is transferred to the second arm 32 up. Since the end of second arm 32 is fixed to liftgate 14, it applies an upward force to swing the far side of liftgate 14 upwardly about main axis A, acting indirectly from lift rod 26. As the opposite side of liftgate 14 begins to raise, the ball stud 38 bottoms out on the upper end of slot 40, and begins to apply a lifting force from lift rod 26 directly to the near side of liftgate 14. Liftgate 14 is thereby evenly raised on each side, eventually reaching its fully open position, as shown in FIG. 1. At the fully open position, the actuator motor 24 shuts off, and the gas springs 18 provide a counterbalancing hold open force to prevent liftgate 14 from swinging closed. The weight of liftgate 14 would continue to keep the ball stud 38 engaged with the upper end of slot 40, as shown in FIG. 6.

Figure 7:
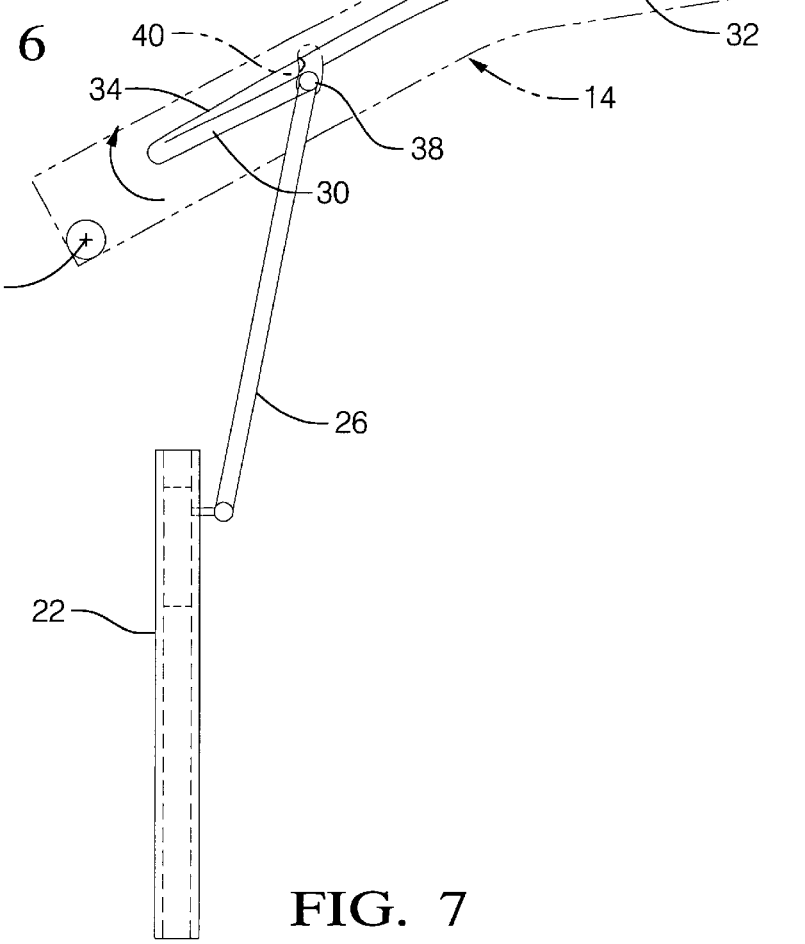
FIG. 7 is a view like FIG. 6, but showing the liftgate being closed.

Referring next to FIGS. 1, 2 and 7, to close liftgate 14, the motor 24 is reversed to pull lift rod 26 down, which pulls down on first arm 30. The gas springs 18 oppose the downward pull, causing first arm 30 to turn in the opposite direction relative to the fixed second arm 32 and twisting the stem 34 within the journals 36, as shown by the arrow. This translates indirectly into a downward force on second arm 32, which pulls down at its fixed lower end on the far side of liftgate 14. Soon thereafter, the ball stud 38 on first arm 30 hits the lower end of slot 40, and begins to pull down directly on the near side of liftgate 14. The net result is an even downward pull on both sides of liftgate 14, opposed to the gas springs 18, which eventually swings liftgate 14 fully down to its closed position, at which point actuator motor 24 turns off. After liftgate 14 latches closed, the torque tube 28 returns to it original, unstressed condition, with the two arms 30 and 32 co planar.

The same system could be used to open and closed any swinging closure panel having opposed sides that were widely enough spaced apart to necessitate that a force be applied to both sides for a balanced opening and closing action. Because of the way that torque tube 28 is attached to liftgate 14, with only one fixed end and the free turning journals, it does not act as a conventional, static reinforcement or buttress for the wide and flexible liftgate 14. Instead, it provides and active means to transfer force and torque from the near side to the far side of liftgate 14, in a controlled fashion, from a single power actuator. The general shape of torque tube 28 is determined by the shape of the space available on liftgate 14 in which to mount it. Therefore, the two arms 30 and 32 might be exactly parallel, or even more divergent than disclosed. So long as the two arms are substantially normal to the stem, enough so to be capable of turning back and forth in opposite directions to wind up the stem 34 slightly, the evenly distributed lifting action will result. The length of the two arms 30 and 32 need not be different, necessarily. The length of first arm 30 is determined more by the length of channel track 22 and lift rod 26, but should be long enough to provide enough leverage to easily twist the stem 34 and thereby transfer torque to the other arm 32. The length of the second arm 32 should be sufficient to provide good support to the far side of liftgate 14, which will depend on how subject to sagging liftgate 14 is, but it should be short enough to be stiff enough not to bow significantly as it lifts. This will depend both on the weight and flexibility of liftgate 14 and the inherent stiffness of the material from which tube 28 is formed. Tube 28 could be mounted to the outside of liftgate 14, rather than in its interior, though it is very likely that esthetic considerations, and the available hollow space, would indicate the interior mounting. Stop members on the liftgate 14 other than the ends of slot 40 could limit the turning of the first arm 30, but the slot 40 cooperates particularly advantageously with the hollow liftgate 14 and the ball stud 38. Therefore, it will be understood that it is not intended to limit the invention to just the embodiment disclosed.

What is claimed is:

1. In a vehicle having a closure panel that pivots up and down between open and closed positions about a main pivot axis, said panel having separated first and second sides, a closure panel actuator comprising;

only one powered actuator link, said link being located proximate to the panel first side and being movable up and down to move the panel between said open and closed positions, a torque tube having a central stem and first and second spaced apart integral arms extending substantially perpendicular from the central stem, the arms being oriented substantially coplanar in a free, unstressed state but capable of moving relative to one another out of said free state to resiliently twist the stem, said stem being journaled to said closure panel to define a turning axis for said stem substantially parallel to said main pivot axis with said first arm extending generally along said panel first side and said second arm extending generally along the panel second side, with an end of said first arm being attached to said powered actuator link and an end of the second arm being fixed to the panel second side, and means for enabling said powered actuator link to apply a lifting force to said second side of said closure panel before applying a lifting force to said first side of said closure panel.

2. A vehicle according to claim 1, wherein said closure panel is a rear liftgate.

3. A vehicle according to claim 2, wherein said rear liftgate has a generally hollow, double walled structure defining an interior space and said torque tube is located substantially within the interior space.

4. A vehicle according to claim 3, wherein said means for enabling said powered actuator link to apply a lifting torque to said second side of said closure panel before applying a lifting force to said first side of said closure panel comprises a slot in said rear liftgate.

5. A vehicle according to claim 4, further comprising a ball stud attached to the end of said first arm, said ball stud extends through said slot and is attached to said powered actuator link.

* * * * *